Figure 1:
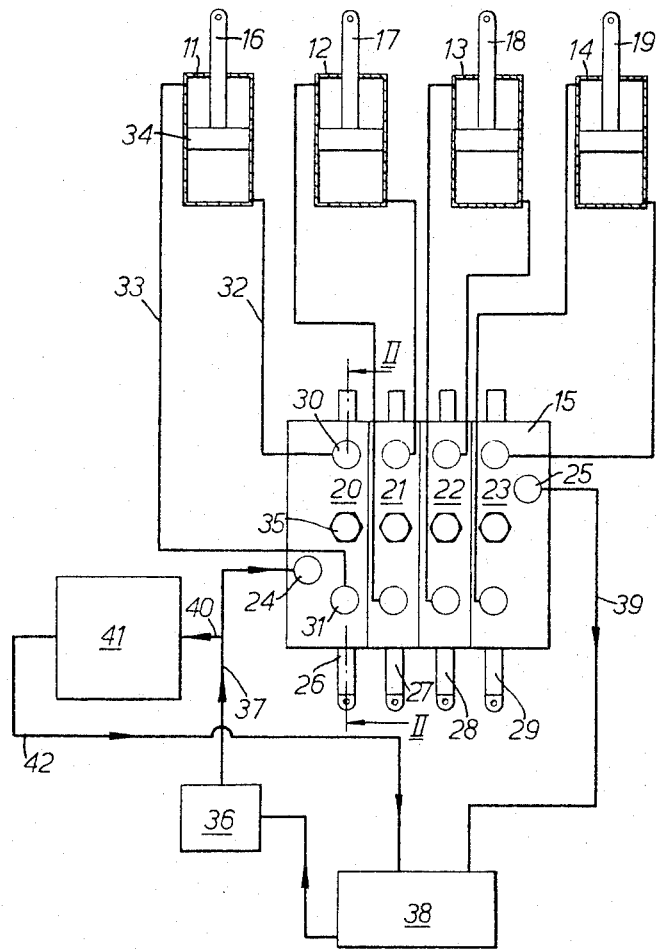

Nov. 8, 1966  F. B. LOWMAN  3,283,773
CONTROL VALVES FOR FLUID-PRESSURE-OPERATED MECHANISMS
Filed July 13, 1964  4 Sheets-Sheet 1

INVENTOR
FRANK B. LOWMAN

BY
Reynolds + Christensen
ATTORNEYS

INVENTOR
FRANK B. LOWMAN
BY
Reynolds & Christensen
ATTORNEYS

INVENTOR
FRANK B. LOWMAN
BY Reynolds & Christensen
ATTORNEYS

United States Patent Office 3,283,773
Patented Nov. 8, 1966

3,283,773
CONTROL VALVES FOR FLUID-PRESSURE-OPERATED MECHANISMS
Frank B. Lowman, Cheltenham, England, assignor to Dowty Hydraulic Units Limited, Cheltenham, England, a British company
Filed July 13, 1964, Ser. No. 381,978
Claims priority, application Great Britain, July 19, 1963, 28,747/63
3 Claims. (Cl. 137—117)

This invention relates to control valves for fluid-pressure-operated mechanisms.

According to this invention a control valve for fluid-pressure-operated mechanisms comprises a valve body within which is provided at least one maneuvering element capable of displacement in the body for the direction of pressure fluid, supplied to the valve, into one or other of two passageways connected to a respective fluid-pressure-operated service or services, a single-flow-rate-sensitive valve element, one associated with each maneuvering element, being positioned in the flow path between the source of pressure fluid and the maneuvering element, each flow-rate-sensitive valve element being effective upon the flow of fluid passing to either the one or the other of the said passageways in dependence upon the positioning of the respective maneuvering element, automatically to control the rate of fluid flow to the respective service or services within predetermined limits.

The or each flow-rate-sensitive valve element may be provided within the valve body and may comprise a hollow member through which the flow of fluid can pass, this member having an orifice formed in it so that a pressure drop is produced, the value of which increases with increase of flow thereby to cause displacement of the element against resilient means. Such displacement is arranged to permit spill of fluid from the supply so that the flow passing to the service or services is maintained at a rate within the predetermined limits.

The or each flow-rate-sensitive valve element may incorporate a check valve to prevent reverse flow of fluid should the supply pressure fall below a normal operating value.

Also, according to the invention, in a fluid pressure system having at least one fluid-pressure-operated motor, there is provided at least one control valve, for controlling the motor or motors, comprising a valve body within which is provided at least one maneuvering element each capable of displacement in the body for the direction of pressure fluid supplied to the valve, into one or other of two passageways connected to the respective motor or motors a single flow-rate-sensitive valve element, one associated with each maneuvering element being positioned in the flow path between the source of pressure fluid and the maneuvering element, the flow-rate-sensitive valve element being effective upon the flow of fluid passing to either the one or the other of the said passageways in dependence upon the positioning of the respective maneuvering element, automatically to control the rate of fluid flow to the respective motor or motors within predetermined limits.

Figure 2:
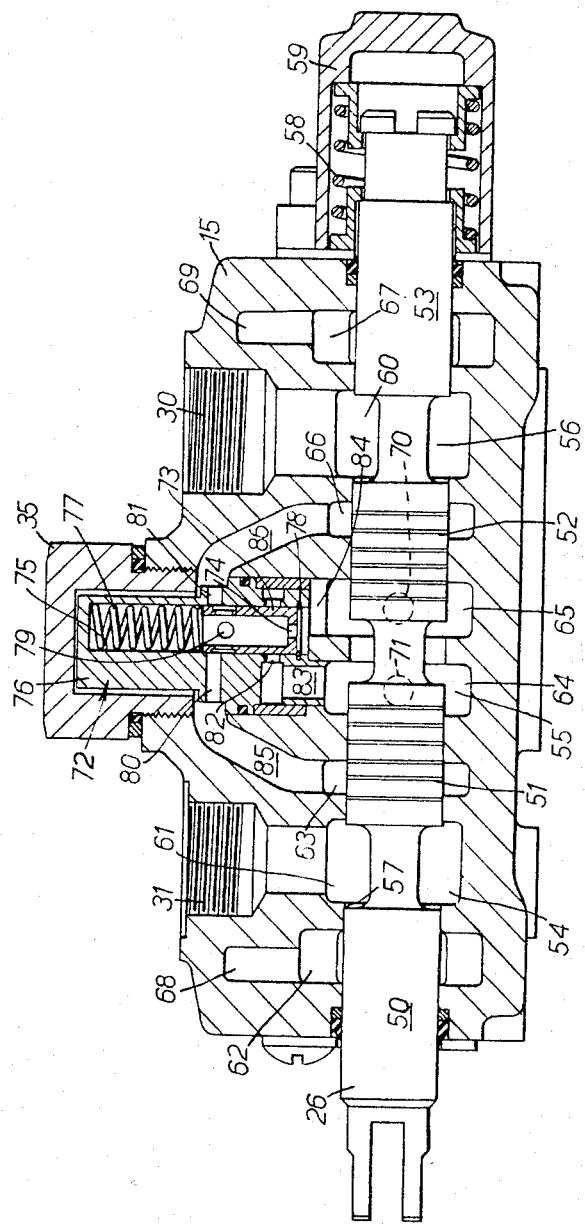
Figure 3:
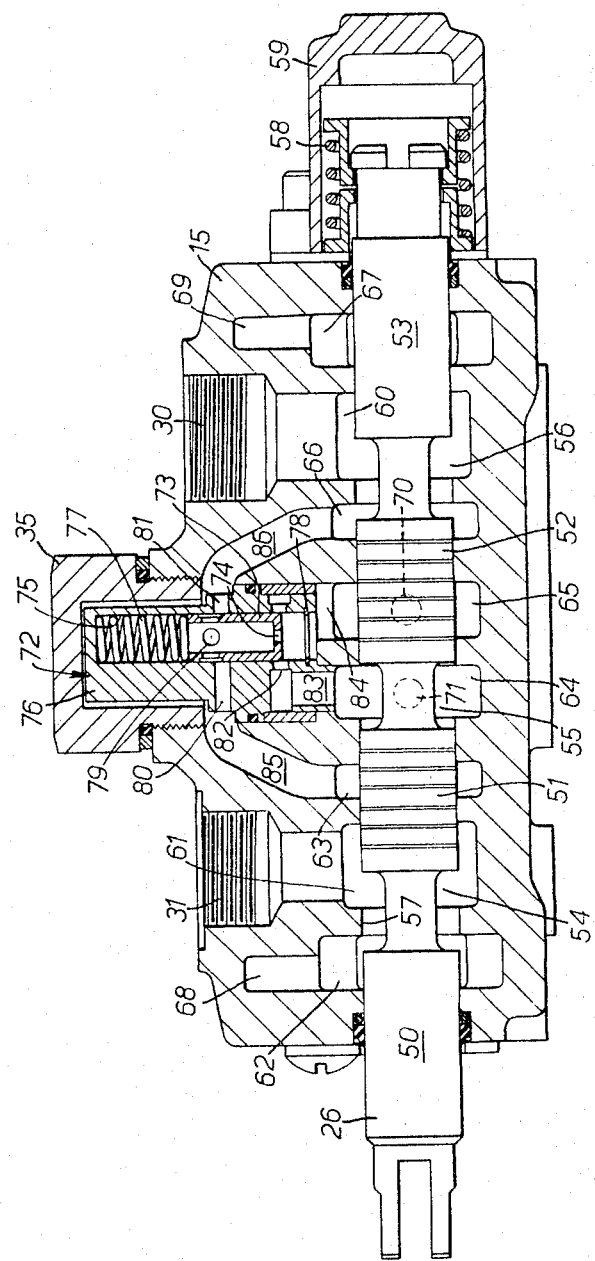
Figure 4:
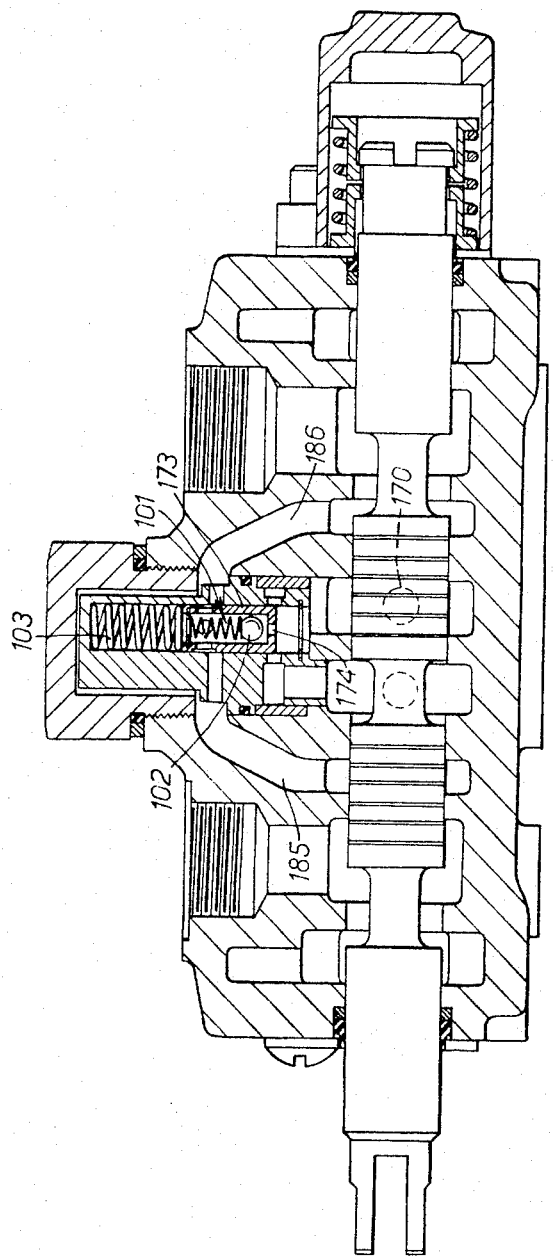

Two embodiments of the invention will now be particularly described by way of example with reference to the accompanying drawings, of which, FIGURE 1 is a diagrammatic representation of a system including four liquid pressure-operated motors controlled by a valve arrangement in accordance with the invention, FIGURE 2 is an enlarged cross-section of part of the valve arrangement shown in FIGURE 1 taken along the line II—II thereon, FIGURE 3 is a cross-section similar to that of FIGURE 2, but with the maneuvering element shown in a different position and, FIGURE 4 is a cross-section similar to that of FIGURE 2, but in which the construction is modified to incorporate check valve means.

With reference to FIGURE 1 of the drawings, a motor system having four double-acting liquid pressure-operated motors 11, 12, 13 and 14 includes a valve block 15 for the control of the motors.

The piston rods 16, 17, 18 and 19 respectively of the motors 11, 12, 13 and 14 are connected to earth moving implements (not shown) carried by an earth moving vehicle and thus the motors control the operative positions of those implements.

The valve block 15 comprises four sections 20, 21, 22 and 23. The section 20 incorporates the liquid pressure inlet 24 for the whole block, while the section 23 incorporates a reservoir connection 25 for the whole block.

Each section incorporates a displaceable maneuvering element in the form of a spool, respectively indicated at 26, 27, 28 and 29.

Each section 20 is provided with a pair of service connections 30 and 31 to which are respectively connected service lines 32 and 33, the service line 32 connecting with the chamber on the underside (in the drawing) of the piston 34 of the respective motor, and the service line 33 connecting with the chamber on the upper side of the piston 34.

Each section of the control valve block 15 is provided with a flow-rate-sensitive valve element hereinafter described in detail with reference to FIGURES 2 and 3, the valve element assembly being retained in its section by means of a screw-threaded retaining member 35.

A pump 36 is provided to supply liquid under pressure through a line 37 to the inlet 24 of the valve block 15, the pump taking its liquid from a reservoir 38. A return line 39 is taken from the connection 25 back to the reservoir 38.

In customary manner the valve block 15 incorporates suitable relief valve means (not shown).

As well as supplying liquid under pressure to the valve block 15 the pump 36 is of such a capacity as to be capable of also simultaneously supplying liquid under pressure through a line 40 to other services on the earth moving vehicle which are diagrammatically indicated as a block at 41, a return line 42 being taken from these services back to the reservoir 38.

Each of the spools 26, 27, 28 and 29 are connected by suitable linkage (not shown) to operating levers in the cab of the vehicle.

Referring now to FIGURES 1, 2 and 3 of the drawings together, the spool 26 shown has four lands 50, 51, 52 and 53, annular spaces 54, 55 and 56 being respectively formed between them. The spool 26 is displaceable in the axial direction in its bore 57, spring centering means 58 being provided for the spool in an extension casing 59.

The service line connections 30 and 31 formed in the block 15 are in permanent communication with the annuli 56 and 54, respectively, through portions 60 and 61 of enlarged diameter formed in the bore 57.

The bore 57 is provided with further portions 62, 63, 64, 65, 66 and 67 of enlarged diameter. The portions 62 and 67 are in communication respectively with ducts 68 and 69 running the length of, and common to, all the sections of the block 15, these ducts both communicating with the reservoir connection 25 in the section 23.

The portion 65 is in communication through a duct 70 common to all the sections of the valve block which connects with the liquid pressure inlet 24 on the section 20 of the block.

The portion 64 is in communication through a duct 71 which again is common to all the sections of the block and which leads to the reservoir connection 25 of the section 23 of the block.

Each spool 26 has associated therewith a flow-rate-sensitive valve element generally indicated at 72, each element comprising a hollow member 73 having an orifice 74 formed in it. The hollow member 73 is arranged for axial sliding movement in a cylindrical bore 75 formed in the body 76 of the assembly at right-angle to the spool bore 57. The assembly is retained in the valve block 15 by means of the screw-threaded member 35 as previously explained. The hollow member 73 is urged downwardly in the drawing by a coil spring 77, a circlip 78 forming an end stop for the member. The member is provided with ports 79 in its wall which are cooperable with ports 80 and 81 formed in the body 76. The lower end portion of the member 73 is co-operable with spill ports 82 formed near the lower end portion of the body 76, these ports communicating through an opening 83 in the body with the enlarged diameter portion 64 of the spool bore 57.

The bore 75 containing the hollow member 73 is in communication through an opening 84 at its lower end in the drawing with the enlarged diameter portion 65 of the bore 57.

Two passageways 85 and 86 respectively place the ports 80 and 81 in communication with the portions 63 and 66.

In operation of the control valve when each spool (for example the spool 26) is in its central equilibrium position, as shown in FIGURE 2, pressure liquid passing through the duct 70 into the portion 65 is unable to pass to either of the service ports 30 or 31 and thus bypasses directly to reservoir 38 through the annulus 55, portion 64, duct 71, connection 25 and line 39. Thus with all the spools in their equilibrium position a through or "open-center" passage is provided across the interior of the block from the inlet connection 24 to the reservoir connection 25. Under these conditions the flow-rate-sensitive valve element 73 remains in its lowermost position against its circlip 78 because since the lands 51 and 52 of the spool 26 close the portions 63 and 66 from the spool bore, the liquid pressure on either side of the orifice 74 is balanced.

When, for extension of the respective motor, the spool 26 is displaced to the left in the drawing against the effort of the spring centering means 58, as shown in FIGURE 3, the "open-center" passage across the interior of the block is closed and pressure liquid delivered through the duct 70 and through the portion 65, orifice 74 port 81, passageway 86, and available at the portion 66, is now allowed to pass through the portion 60 to the service line connection 30, because the land 52 of the spool now opens the portion 66 to the portion 60. At the same time the land 50 of the spool opens portion 61 to portion 62 so that the service line connection 31 is in communication with the reservoir 38 through the common duct 68, reservoir connection 25 and return line 39. The flow-rate-sensitive valve element 73 is now operative, liquid under pressure passing through the opening 84 thereto and a pressured drop occurring across the orifice 74 and being reacted by the coil spring 77. In consequence the element 73 moves upwardly in the drawing so that the ports 79 are in full registry with the ports 80 and 81. The characteristics of the flow-rate-sensitive valve assembly are such that if the flow of liquid through the service line port 30 to the respective motor increases beyond a predetermined value, this value being related to the desired maximum speed of operation of that motor, displacement of the element 73 further in the upward direction, as shown in the drawing, occurs automatically so that the lower end portion of the element 73 opens the spill ports 82 to pressure liquid upstream of the orifice 74, spill flow thus occurring through the opening 83, portion 64 and duct 71 to the reservoir. By so spilling an appropriate amount of liquid to reservoir the flow of liquid to the respective motor is maintained substantially constant.

The converse of the above sequence occurs when the spool 26 is moved to the right in the drawing for contraction of the respective motor.

Thus, by virtue of its positioning upstream of the maneuvering spool 26, the single flow-rate-sensitive valve element of each section of the control valve block is capable of automatically controlling flow rate when the spool is positioned to cause movement of the respective motor in one direction or alternatively when it is positioned to cause movement of the motor in the other direction.

It will be understood that since the system as shown in FIGURE 1 includes services 41 other than the four motors 11, 12, 13 and 14, then when these other services are static, or alternatively utilising small pressure liquid flow it is not desirable that the relatively high delivery flow of the pump 36 then available, should be passed to one or more of the four motors otherwise excessively high speed operation of the motors will occur. It is thus necessary for some form of flow-rate control to be incorporated in the central valve arrangement assembly associated with the motors 11, 12, 13 and 14. By so providing the flow-rate-sensitive valve elements as hereinbefore described, one for each spool valve, desired motor speed control under these circumstances is achieved and with a relatively compact control valve structure.

Referring to FIGURE 4 of the drawings there is shown an alternative embodiment of the invention, wherein the the construction of the valve block is similar to that described with reference to FIGURES 1, 2 and 3 of the drawings except that each flow-rate-sensitive valve element incorporates a single check valve 101. This check valve is housed within the flow-rate-sensitive valve element 173 downstream of the orifice 174 and comprises a ball 102 biased towards the orifice by a coil spring 103. The check valve is operative to prevent inadvertent reverse flow of fluid from either side of the respective motor and through passageway 185 or 186 and duct 170 back towards the pump should the supply pressure fall below its normal operating value.

In another alternative embodiment of the invention, instead of being positioned within the valve block, each flow-rate-sensitive valve element is positioned externally of the valve block at a convenient situation in the flow path between the associated pump and the valve block.

Although in the embodiments described with reference to the drawings the control valve block is described as having four spool-type maneuvering elements, in other embodiments of the invention other desired numbers of such elements are provided, but in each case only one flow-rate-sensitive control valve element is provided in association with each maneuvering element.

Further, in alternative embodiments of the invention instead of each maneuvering element controlling one motor, with advantage it is employed to control a plurality of either single-acting or double-acting motors or the like arranged in parallel manner.

Although in the embodiments described with reference to the drawings the invention is applied in the implement operating system of an earth moving vehicle, the invention may with advantage be applied in other systems where the pump of the system is capable of large flows and it is essential under certain conditions of operation of the motors that rate of flow to at least one of those motors is controlled within specific limits.

I claim as my invention:

1. A control valve which is designed to control fluid-pressure-operated mechanisms, which control valve comprises in combination:
   (a) a valve body,
   (b) a plurality of maneuvering elements, each housed within the valve body, and each capable of displacement therein for the direction of pressure fluid, supplied to the valve, into one or other of two respective passageways adapted to be connected to a respective fluid-pressure-operated service, (c) an open-center passage which when the maneuvering elements are all in their neutral positions places a single pressure fluid inlet connection to the body in communication with a single reservoir connection from the body, movement of any one maneuvering element away from its neutral position closing the open-center passage, and, (d) a plurality of flow-rate-sensitive valve elements, one such valve element being associated with each maneuvering element, being positioned with a single entry thereto in the flow path between the source of pressure fluid and the respective maneuvering element, and being effective upon the flow of fluid passing to either the one or the other of the said respective passageways in dependence upon the positioning of the respective maneuvering element, automatically to control the rate of fluid flow to the respective service within predetermined limits, but at no time having any influence upon the flow of fluid through the open-center passage, or vice versa, (e) each of said flow-rate-sensitive valve elements comprising a hollow member housed so as to be displacable against resilient means and positioned so that the flow of fluid can pass through it, the member having an orifice formed in it and also being cooperable with spill ports formed in the member in which it is housed.

2. A control valve as claimed in claim 1, wherein each flow-rate-sensitive valve element is provided within the valve body.

3. A control valve as claimed in claim 1, wherein each flow-rate-sensitive valve element incorporates a check valve, whereby flow through the valve element is permitted only in a direction towards the respective fluid-pressure-operated service or services.

References Cited by the Examiner

UNITED STATES PATENTS

| 2,869,567 | 1/1959 | Carlson | 137—117 |
| 3,128,789 | 4/1964 | Wagner | 137—596.13 |

FOREIGN PATENTS

| 800,951 | 9/1958 | Great Britain. |

M. CARY NELSON, *Primary Examiner.*

MARTIN P. SCHWADRON, *Examiner.*

R. JAY MILLER, *Assistant Examiner.*